United States Patent [19]
Eischen

[11] Patent Number: 5,988,731
[45] Date of Patent: *Nov. 23, 1999

[54] CAMPING KIT FOR WHEELED VEHICLES

[76] Inventor: Roger Eischen, 4090 W. Linda La., Chandler, Ariz. 85226

[*] Notice: This patent issued on a continued prosecution application filed under 37 CFR 1.53(d), and is subject to the twenty year patent term provisions of 35 U.S.C. 154(a)(2).

[21] Appl. No.: 08/862,651

[22] Filed: May 23, 1997

[51] Int. Cl.$^6$ ................................................. B60P 3/345
[52] U.S. Cl. ......................... 296/159; 296/165; 135/88.15
[58] Field of Search ............................. 296/26.12, 26.13, 296/159, 160, 170, 173, 165; 135/88.13, 88.15–88.17

[56] References Cited

U.S. PATENT DOCUMENTS

| | | | |
|---|---|---|---|
| 1,243,288 | 10/1917 | Hall | 135/88.13 |
| 2,003,816 | 6/1935 | Allen et al. | 296/173 |
| 2,481,230 | 9/1949 | MacDonald, Jr. | |
| 3,352,312 | 11/1967 | Martin | 135/88.13 |
| 3,466,082 | 9/1969 | Branch | 296/165 |
| 3,558,181 | 1/1971 | Peterson | 296/170 |
| 4,113,301 | 9/1978 | Olmstead | 52/66 |
| 4,652,040 | 3/1987 | Mahan | 296/159 |
| 5,462,330 | 10/1995 | Brown | 296/172 |

FOREIGN PATENT DOCUMENTS

| | | | |
|---|---|---|---|
| 1253498 | 1/1961 | France | 296/173 |
| 8303391 | 10/1983 | WIPO | 296/165 |

*Primary Examiner*—Dennis H. Pedder
*Attorney, Agent, or Firm*—Cahill, Sutton & Thomas P.L.C.

[57] ABSTRACT

A tub support kit which can be dismantled and completely removed from the cargo tub of a wheeled vehicle such as a utility trailer or a pickup truck. The kit includes a frame structure which is adapted to rest upright at the rear end of the tub near a drop down tailgate. U-shaped support members extend out over the side walls of the tub and have their rear legs separably connected to the frame structure. Two berth bases overlie the support members and are releasably connected to the U-shaped support members and the frame structure to hold the assemblage together.

5 Claims, 3 Drawing Sheets

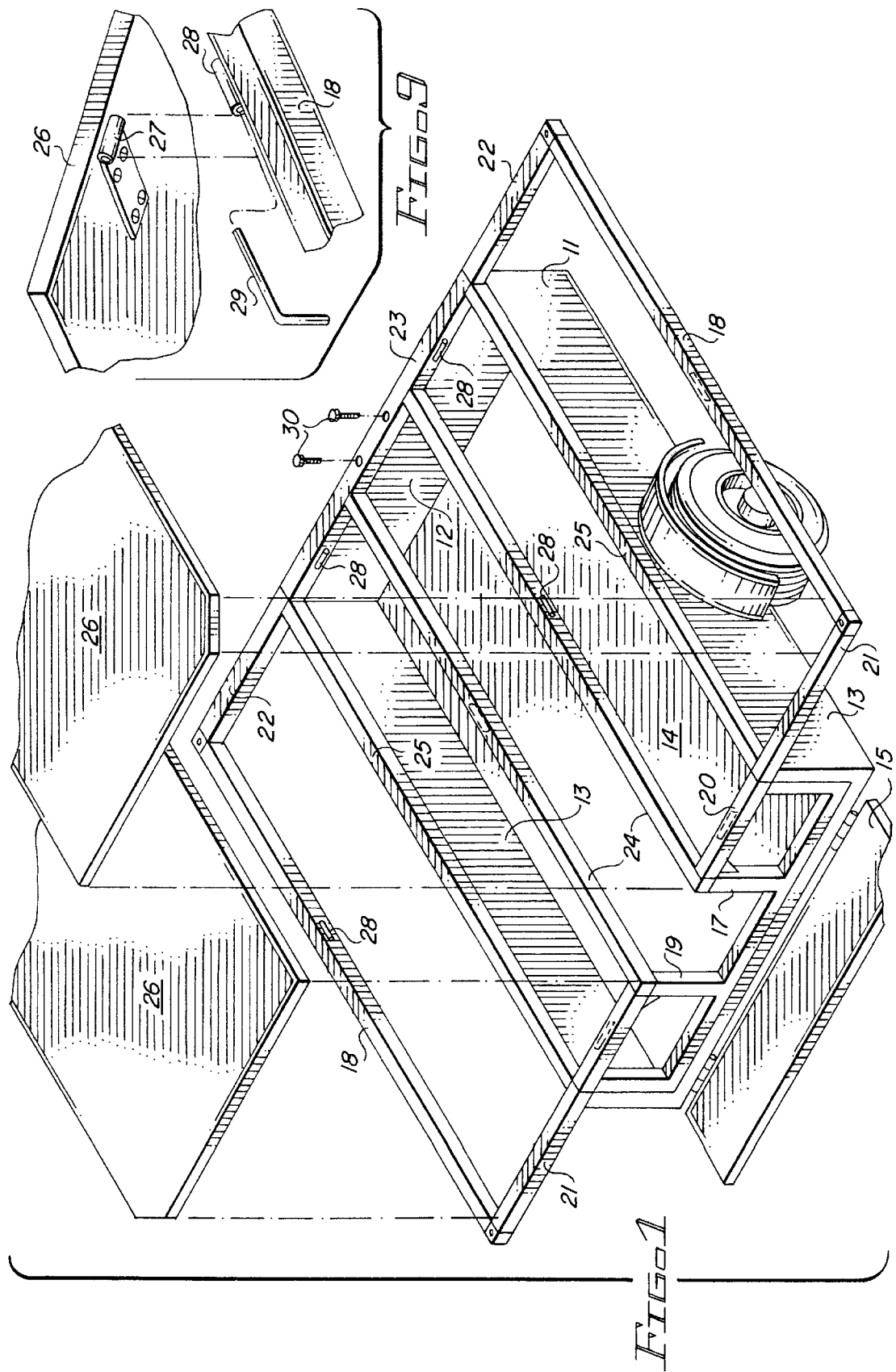

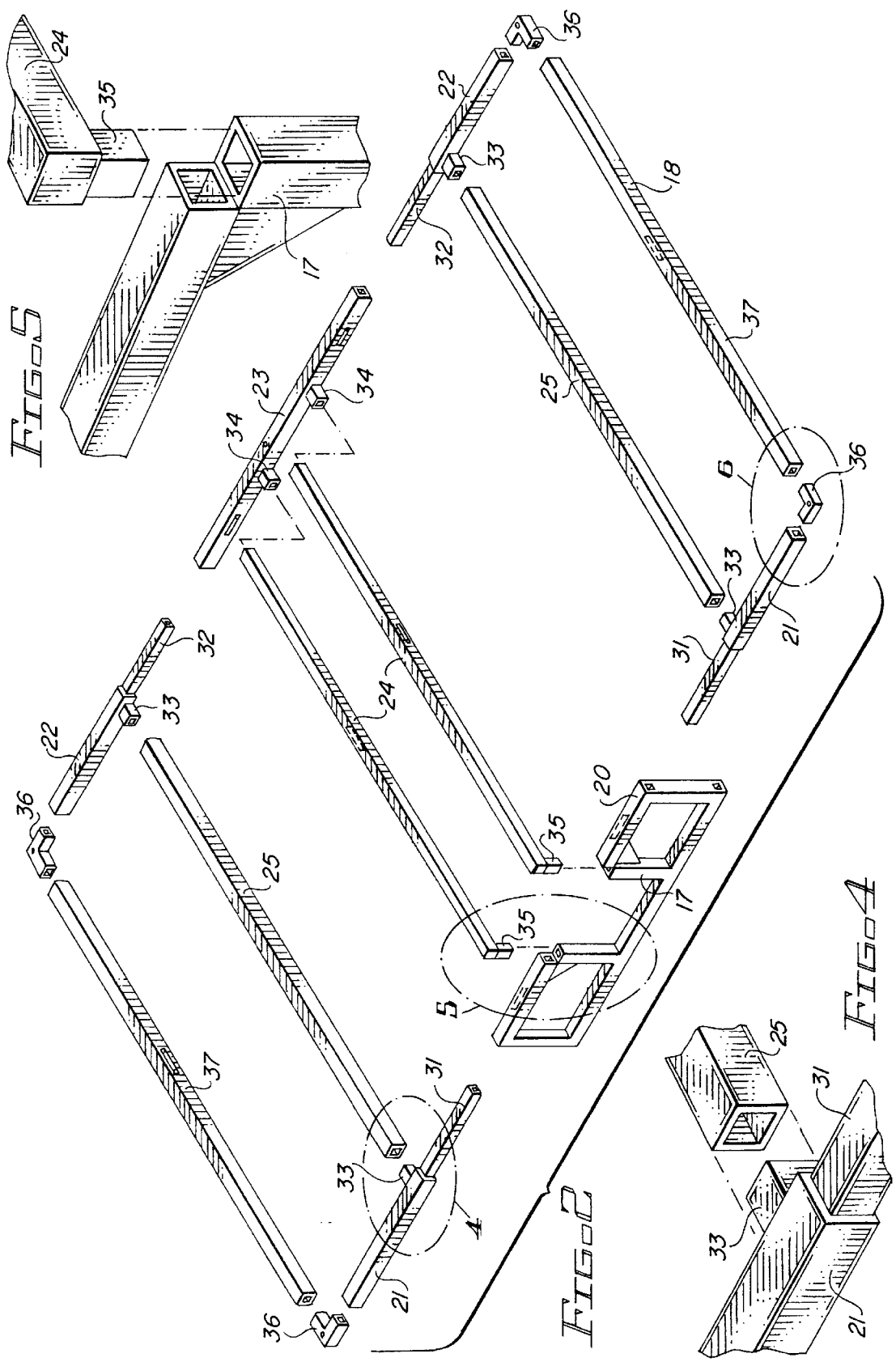

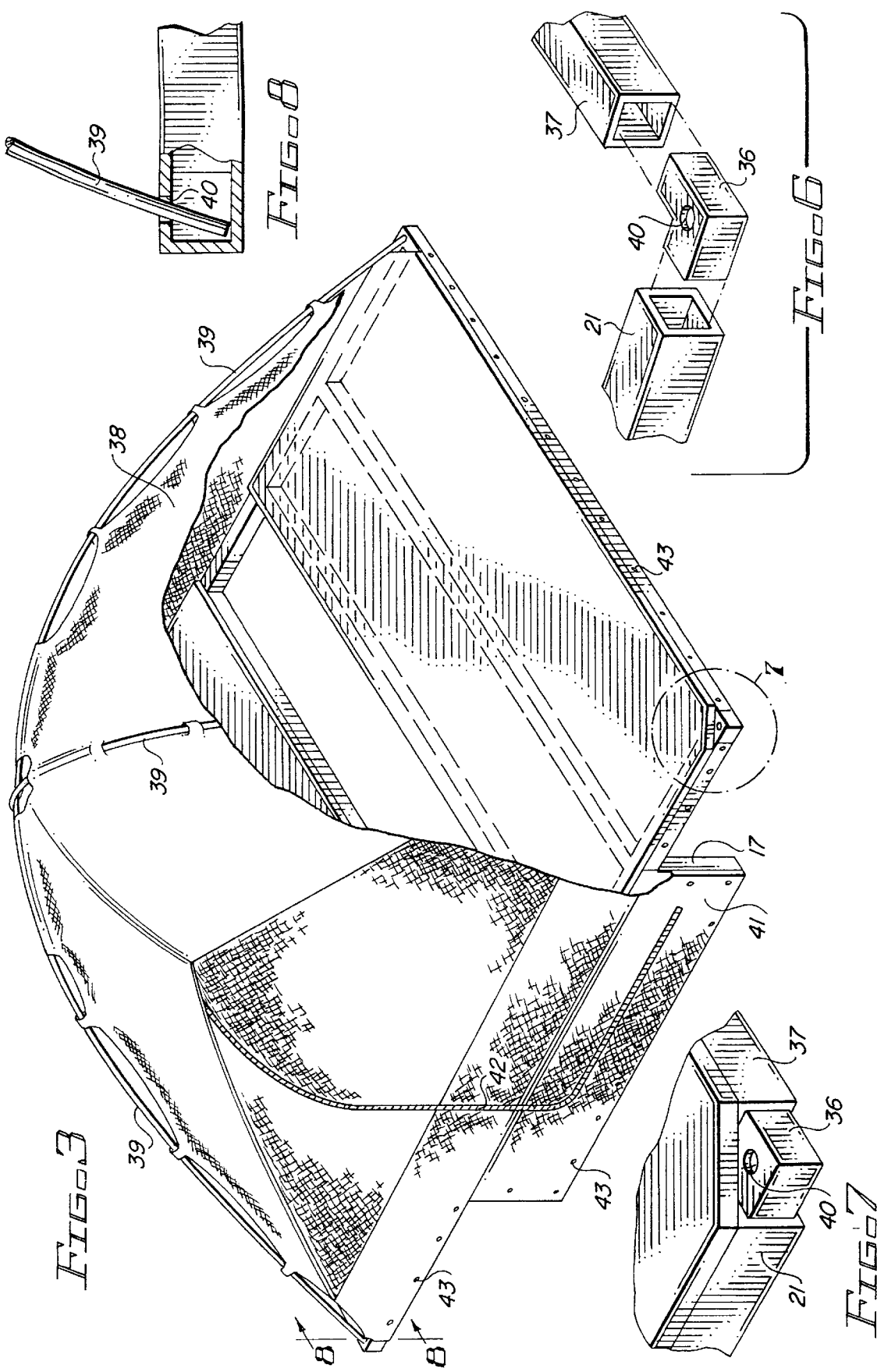

CAMPING KIT FOR WHEELED VEHICLES

TECHNICAL FIELD

This invention is concerned with the erection of a camping facility in and on the cargo tub of a wheeled vehicle such as a utility trailer or a pickup truck.

BACKGROUND ART

Many proposals have been made for converting the cargo tub of a wheeled vehicle into a sleeping facility. The rigid camper shell that is affixed over the tub of a pickup truck represents the simplest from of such proposals. But that approach affords very limited sleeping space—just the cargo space in the tub.

Hence, it has been proposed that the vehicle be modified to accommodate structures that can be erected and expanded to provide larger sleeping quarters. Examples of this type proposal can be found in the following United States patents:

U.S. Pat. No. 2,003,816, granted Jun. 4, 1935 to R. S. Allen, et al. for "Camp Trailer";

U.S. Pat. No. 2,481,230, granted Sep. 6, 1949 to W. B. MacDonald, Jr. for "Vehicle Trailer";

U.S. Pat. No. 4,113,301 granted Sep. 12, 1978 to W. D. Olmstead for "Compact Tent-Type Camping Trailer"; and U.S. Pat. No. 5,462,330 granted Oct. 31, 1995 to Q. M. Brown for "Folding Camping/Cargo Trailer".

The arrangements disclosed in each of these patents require modification of the vehicle tub to accommodate camping structures. And in the case of the MacDonald, Jr., Olmstead and Brown patents the camping structure is permanently affixed to the vehicle tub significantly interfering with its use for hauling conventional cargo.

There continues to be a need for a camping kit which can be erected on the vehicle tub without modifying the tub and which is completely removable to permit use of the vehicle to haul cargo as originally intended.

DISCLOSURE OF THE INVENTION

The kit of this invention includes a frame structure which is adapted to rest upright at the rear end of the vehicle tub near the drop-down tailgate of the tub. U-shaped support members extend out over the side walls of the tub and have their rear legs separably connected to the frame structure. Two flat sheets of berth bases overlie the support members and are releasably connected to the U-shaped support members and to the frame structure to hold the assemblage together. The three legs of each U-shaped support member are separable from each other for storage when not in use.

BRIEF DESCRIPTION OF THE DRAWINGS

The invention is described in greater detail hereinafter by reference to the accompanying drawings wherein:

FIG. 1 is an exploded isometric view illustrating the manner in which portions of the kit are erected on the cargo tub of a vehicle;

FIG. 2 is an exploded isometric view showing how components of the kit are disassembled for storage;

FIG. 3 is an isometric view of the kit components of this invention shown in assembled condition with portions of the tent broken away;

FIG. 4 is an enlarged fragmentary perspective view of that region of FIG. 2 within circle 4 in FIG. 2;

FIG. 5 is an enlarged fragmentary perspective view of that region of FIG. 2 within circle 5 in FIG. 2;

FIG. 6 is an enlarged fragmentary perspective view of that region in FIG. 2 within circle 6 in FIG. 2;

FIG. 7 is an enlarged fragmentary perspective view of that portion of FIG. 3 within circle 7 in FIG. 3;

FIG. 8 is an enlarged fragmentary sectional view taken as indicated by line 8—8 in FIG. 3; and FIG. 9 is a fragmentary perspective view illustrating a connector employed in the invention.

BEST MODE FOR CARRYING OUT THE INVENTION

Referring particularly to FIG. 1, the camper kit of this invention is shown being erected on the cargo tub 11 of a wheeled vehicle such as a utility trailer or pickup truck. The vehicle tub 11 has a front wall 12, two opposite side walls 13, a bed 14 and a drop down tailgate 15 which collectively define a cargo space 16.

The principal components of the camper kit include a frame structure 17 and a pair of oppositely disposed U-shaped support members 18. The frame structure 17 is sized to fit snugly between the side walls 13 of the cargo tub in an upright position at the rear of the cargo space near the tailgate 15. The frame structure may be fabricated of square metal tubing and possesses an opening 19 extending downwardly from the upper edge 20 of the structure.

The upper edge 20 of frame structure 17 extends slightly above the upper edges of tub side walls 13 so that when the U-shaped support members 18 have their rear legs 21 connected to the frame structure as shown in FIG. 1 the U-shaped support members extend out and over the tub side walls. The forward legs 22 of the U-shaped members also extend over and rest on the side walls 13 of the tub 11. The forward legs 22 of the U-shaped members are connected by a center piece 23.

The kit also preferably includes two pairs 24 and 25 of longerons. The inner pair 24 of longerons have their rear ends connected to the frame structure 17 adjacent the sides of opening 19 therein. The forward ends of the inner longerons 24 are connected to the centerpiece 23. The intermediate pair 25 of longerons have their rear ends connected to the rear legs 21 of U-shaped support member 18 near the connection between the U-shaped members and the frame structure 17. The forward ends of intermediate longerons 25 are connected to the forward legs 22 of the U-shaped members.

All of the aforementioned components of the kit are preferably fabricated of square metal tubing having essentially the same cross-section.

Overlying this tubing assemblage are a pair of sheets 26 which function as berth bases for sleeping gear. The opposed inner edges of the sheets 26 are spaced apart the same distance as the width of the opening 19 in the frame structure 17. This provides leg room for persons sitting or entering and leaving the camping facility.

The kit includes means for securing spaced regions of the sheets 26 to the frame structure 17, the U-shaped members 18 and the inner longerons 24. FIG. 9 illustrates one type of securing means which can be used. This includes a first tubular sleeve 27 affixed to the under surface of a sheet 26 and a second tubular sleeve 28 affixed to a U-shaped member 18. With a sheet in proper position the tubular sleeves 27 and 28 are aligned and in close proximity to each other to receive a locking pin 29.

It can be appreciated that by virtue of the frame structure 17 extending down into the cargo tub 11, the tubular assembly and sheets 26 are stabilized against transverse movement on the tub. If desired the structure can be stabilized against longitudinal movement by one or more fasteners 30 extending through centerpiece 23 into the front wall 12 of the tub. No other modification to the tub is required.

With the sheets 26 secured to the supporting tubular assemblage as described above the components of the assemblage are held together by the sheets. When the securing means are released, as by removing locking pins 29 and sheets 26 lifted free, the assemblage of tubular components can be disassembled in the manner illustrated in FIG. 2.

The detachable connections for the tubular assemblage are best illustrated in FIG. 2 in connection with FIGS. 4, 5 and 6. These connections are provided by sections of rectangular tubing or rod stock sized to slip into the inside of the tubing from which the assemblage is fabricated.

The rear legs 21 of the U-shaped members 18 have elongated connectors 31 adapted to slide in and out of the tubing forming the top edge of frame structure 17. The front legs 22 of each U-shaped member 18 carry similar connectors 32 adapted to slide in and out of center piece 23. The front and rear legs 22 and 21 of the U-shaped members 18 have stub connectors 33 thereon for entering and supporting intermediate longerons 25. (See FIG. 4) The inner longerons 24 are supported at their forward ends by stub connectors 34 carried by center piece 23 and have stub connectors 35 depending from their rear ends for entering the tubing of the frame structure 17. (See FIG. 5) Elbow connectors 36 join the corners of the U-shaped members 18 where the front and rear legs 22 and 21 meet the bight 37. (See FIG. 6)

With the tubular assemblage in place on the vehicle tub 11 and the sheets 26 in place and connected to the assemblage a collapsible tent 38 can be erected to complete the camping facility. As shown in FIG. 3, this may be a dome tent having flexible support poles 39. The ends of the tent poles 39 may be lodged in openings 40 provided in elbow connectors 36 in the U-shaped members 18. (See FIG. 8)

The wall of the tent 38 at the rear of the vehicle preferably includes a flap 41 covering frame structure 17 and also has a zipper 42 which, when unzipped, affords an access opening to the tent interior. It will be noted that the opening 19 in the frame structure 17 is in alignment with the tent opening facilitating stepping or crawling into the tent.

It is also preferable to provide a series of snaps 43 around the periphery of the tent to secure the tent in place on the tubular assemblage.

From the foregoing it should be apparent that the kit of this invention can be employed to erect a camping structure on a vehicle cargo tub with no modification of the tub. Further the kit components are easily disassembled for storage leaving the cargo tub completely free for hauling cargo.

What is claimed is:

1. A kit for erecting a camping structure on a cargo tub of a wheeled vehicle, said tub having a bed, a longitudinal axis, a pair of side walls extending parallel to said longitudinal axis, a front wall and drop down tailgate both of which extend transverse to said longitudinal axis and collectively defining a cargo space, said kit comprising:

a frame structure for being vertically positioned between the pair of side walls adjacent to the tailgate and extending transversely of said longitudinal axis, said frame structure having a continuous bottom edge, a non-continuous top edge, a pair of inner and outer side edges and an opening defined by the non-continuous top edge, the inner side edges and the continuous bottom edge and extending downwardly from the top edge, a center piece adjacent the front wall of said tub, a pair of U-shaped support members each having front and rear horizontal legs extending transverse to said longitudinal axis and an outer leg connecting said front and rear legs and extending parallel to said longitudinal axis, said U-shaped support members rest on the said walls of said tub and project outwardly therefrom, said U-shaped support members being releasably coupled to said frame structure and said center piece by interengaging elements, and a pair of berth bases positioned on said U-shaped support members, said bases having an inner edge aligned with the inner side edges of the frame structure at the opening therein.

2. The kit as defined in claim 1 in which the legs of the U-shaped support members are separable from each other for storage.

3. The kit as defined in claim 1 further comprising means for supporting a tent on said U-shaped support members.

4. The kit as defined in claim 2 further comprising a dome tent and the means for supporting the tent comprise flexible support poles having ends and said U-shaped support members have openings therein for receiving the ends of said support poles.

5. The kit as defined in claim 1 wherein the center piece rests on the front wall of said tub opposite said frame structure, and includes a pair of longerons which extend between and are releasably coupled to said frame structure and said center piece.

* * * * *